(12) United States Patent
Zhang et al.

(10) Patent No.: US 8,670,401 B2
(45) Date of Patent: Mar. 11, 2014

(54) METHOD OF LOAD ESTIMATION

(75) Inventors: Zhang Zhang, Beijing (CN); Xinyu Gu, Beijing (CN); Claes Tidestav, Bålsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 27 days.

(21) Appl. No.: 13/378,105

(22) PCT Filed: Jun. 25, 2009

(86) PCT No.: PCT/SE2009/050813
§ 371 (c)(1),
(2), (4) Date: Dec. 14, 2011

(87) PCT Pub. No.: WO2010/151189
PCT Pub. Date: Dec. 29, 2010

(65) Prior Publication Data
US 2012/0087275 A1    Apr. 12, 2012

(51) Int. Cl.
*H04W 4/00*        (2009.01)
(52) U.S. Cl.
USPC ............ 370/329; 370/338; 370/341; 370/348
(58) Field of Classification Search
USPC ................. 370/329, 335, 338, 341, 342, 348; 455/453
See application file for complete search history.

(56) References Cited

U.S. PATENT DOCUMENTS

| 2004/0209624 A1* | 10/2004 | Rune et al. ............... 455/453 |
| 2007/0019668 A1* | 1/2007 | Lee et al. .................. 370/458 |
| 2007/0054671 A1* | 3/2007 | Meyers et al. ............. 455/453 |
| 2007/0155395 A1* | 7/2007 | Gopalakrishnan et al. ... 455/453 |
| 2008/0188235 A1* | 8/2008 | Kim et al. .................. 455/453 |

OTHER PUBLICATIONS

Zhang, J. et al. "A Novel Load Control Strategy for TD-SCDMA Enhanced Uplink." Vehicular Technology Conference, 2008. VTC Spring 2008. May 11-14, 2008, pp. 2677-2680.
Zhang, D. et al. "HSUPA Scheduling Algorithms Utilizing RoT Measurements and Interference Cancellations." IEEE International Conference on Communications, 2008. May 19-23, 2008. pp. 5033-5037.

* cited by examiner

*Primary Examiner* — Brian D Nguyen
*Assistant Examiner* — Toan Nguyen
(74) *Attorney, Agent, or Firm* — Coats and Bennett PLLC

(57) ABSTRACT

In a method and a device for determining or predicting the uplink load based on measurements, including CIR and adjustable parameters, the parameters are adjusted based on measurements of received power. Hereby an improved determination of the uplink load can be obtained.

18 Claims, 4 Drawing Sheets

METHOD OF LOAD ESTIMATION

TECHNICAL FIELD

The present invention relates to a method and a device for determining load in a cellular radio system.

BACKGROUND

Load control and scheduling are two important functionalities in a Wideband Code Division Multiple Access (WCDMA) system. Load control and scheduling are required to keep the resource usage at a desired level, while maximizing usage of the available resources. Load estimation is one basic module in these two functionalities which estimates the (radio) resource usage.

For the uplink, the common radio resource shared by the mobile stations is the total amount of tolerable interference, which can be defined as the average interference over all the antennas. A relative measure of total interference is rise over thermal, i.e. total interference relative to thermal noise.

Further, the load factor represents the portion of uplink interference that a certain channel of a particular mobile station generates, which can be defined as the interference on the channel caused by the mobile station divided by the total interference. The total load factor of different channels equals to the sum of load factors due to different channels. Accordingly, uplink load control determines for each cell the maximum available load room that can be used by the scheduling function based on the uplink interference situation in that cell. Uplink scheduling determines for each cell the maximum data rate that can be supported given the maximum available load room, which is also called load headroom to rate mapping. This is typically implemented by first determining the supportable power offset between the channel to be scheduled (or requiring rate increase) and the Dedicated Physical Control Channel (DPCCH) channel, which is a fixed rate channel, see third generation partnership project (3GPP) Technical specification TS 25.211, "Physical channels and mapping of transport channels onto physical channels (FDD) (release 7)", V7.2.0, and as shown in formula (1):

$$\text{pwroff}_{grant\_est}^k = f(\text{load}_{avi}^k, \text{load}_{DPCCH\_est}^k, \text{load}_{sched\_est}^k) \quad (1)$$

Where:
pwroff$_{grant\_est}^k$ is the (estimated) power offset that can be granted for the channel to be scheduled (or requiring rate increase) for user k
load$_{avi}^k$ is the load room available for user k, which equals to the maximum available load room minus the total (estimated) load from the users that are transmitting.
load$_{DPCCH\_est}^k$ is the (estimated) DPCCH load from user k. Note that the DPCCH load will vary when the data rate of the other channel (belong to the same user) is changed.
load$_{sched\_est}^k$ is the (estimated) load from the channel(s) that are already scheduled for user k.

The supportable data rate is then determined based on the granted power offset. The DPCCH load will decrease for a user that is granted more data rate. These two control functionalities are performed iteratively to cope with e.g. varying traffic or channel conditions.

Uplink load estimation estimates the load that has been or will be generated in each cell for different channels. The accuracy of the uplink load estimation is crucial to make sure that the uplink load control and the uplink scheduling work as desired. Any error in the uplink load estimation may lead to:

Load overestimation, resulting in that too conservative data rate is granted, consequently insufficient resource usage and also throughput loss Load underestimation, resulting in that too aggressive data rate is granted, consequently excessive resource usage. This may also lead to uplink instability, i.e. mobile station power and rise over thermal oscillation, which is especially harmful to users with high QoS requirement (fixed rate and/or short delay, etc.) services.

The uplink load can be estimated based on either the Carrier to Interference Ratio (CIR) (or equivalently, the date rate) or the wide band received power (according to the original definition of load factor), see H. Holma and A. Toskala, "WCDMA for UMTS, Radio Access for Third Generation Mobile Communications", Chichester, UK: Wiley, 2004.

Suppose user k has N uplink channels, formula (2) below is currently used for the CIR based load estimation:

$$\text{Load}_{i\_est}^k = \frac{CIR_{1\_meas}^k \cdot \text{pwroff}_{i\_est}^k}{\text{loadpar}_1 + \text{loadpar}_2 \cdot CIR_{1\_meas}^k \cdot \left(1 + \sum_{i=2}^{N} \text{pwroff}_{i\_est}^k\right)} \quad (2)$$

Where:
$CIR_{1\_meas}^k$ is the (measured) CIR of the $1^{st}$ channel from user k
pwroff$_{i\_est}^k$ is the estimated) power offset between the $i^{th}$ channel and the $1^{st}$ channel of user k
Loadpar$_1$ is the first load estimation parameter.
Loadpar$_2$ is the second load estimation parameter.

These two load parameters are currently fixed and set on the Radio Network Controller (RNC) level. However, in reality they are varied with radio environment, receiver scheme, and also data rate and interference levels (for some kind of receivers for example Generalized RAKE receivers (GRAKE)) etc.

For other types of receivers, the actual load expressions are more complicated. This is true for e.g. Successive Interference Cancellation (SIC) receivers and GRAKE+ receivers. In this case, the load depends on several factors, all of which are difficult to take into account in load formula like (2). One solution is to introduce a simpler expression that is accurate only in a limited region close to the current operating point. Such an expression may serve as a first order estimation of the load contribution, e.g., $$\text{Load}_{i\_est}^k = CIR_{1\_meas}^k \text{pwroff}_{i\_est}^k \cdot \text{loadpar} \quad (3)$$

In this case, it is acknowledged that the load parameter loadpar changes when e.g. the User Equipment (UE)/Mobile station rate changes. Using (2) for predicting the load may be more accurate than using (3) for some types of receivers. On the other hand, (3) is applicable to a wider range of receivers.

For power based load estimation, the load factor due to the $i^{st}$ channel of user k is estimated as:

$$\text{Load}_{i\_est}^k = \frac{pwr_{i\_meas}^k}{Itot_{meas}} \quad (4)$$

Where:
pwr$_{i\_meas}^k$ is the (measured) wide band received power generated by the $i^{st}$ channel of user k
Itot$_{meas}$ is the (measured) total interference As set out above for CIR based load estimation, the load parameters are fixed, but in reality they may vary. This variation may cause load estimation error and large rise over thermal oscillation. To ensure system stability fairly large load margin is needed which may negatively impact the system throughput. Furthermore, it is difficult to configure the load parameters and load margins that are suitable for all scenarios while a too conservative setting will decrease the system performance.

Moreover, inaccurate load estimation (even in average sense) make it difficult to implement resource utilization based scheduling schemes (e.g. resource fair scheduling or minimal resource utilization scheduling). This limits the performance of the scheduling functionality.

One solution to this is to dynamically adapt the load parameters. However, exact expressions of the load parameters depend on the receiver schemes. Even the CIR based load estimation formula itself may have different forms other than formula (2) when receivers other than RAKE(2) and GRAKE (2) are used, and it is hard to derive the load estimation formula as well as the expressions for the load parameters for some receivers, e.g. GRAKE type 3, successive interference cancellation (SIC), etc. Consequently it is hard to adopt the load parameters adaptation directly based on their theoretical expressions.

This may even be impossible in some cases, such as Uplink (UL) Coordinated Multi Point transmission/reception (CoMP). In UL CoMP, the number of antenna signals that are used during the detection can change based on how many links are strong. In effect, this leads to a change in the diversity factor for the connection. This can be observed as the actual receiver type is updated, going from e.g. GRAKE2 to GRAKE4.

Another solution is to control the received power instead of CIR, either the DPCCH received power or the total received power, in inner loop power control. In this way the rise over thermal oscillation is inherently avoided even with fixed load parameters. However, it is crucial to ensure the quality of DPCCH which provides the reference for channel estimation and demodulation, etc. Therefore it is not possible to simply discard the CIR based power control for DPCCH, and in order to control the total received power another control loop needs to be introduced, which is more complicated.

For power based load estimation, the corresponding load estimation formula (formula (4)) is independent of the receiver schemes and the variation in radio environment, receiver schemes, etc. is automatically reflected in the wide band received power. This is because the uplink (inner loop) power control always tries to adjust the User Equipment power so that the perceived CIR at the base station is stable, i.e. close to the CIR target. The level of received signal power will however, depend on the receiver scheme, data rate and radio environment.

However, the variation in power also leads to that the power based load estimation is more sensitive to delays than the CIR based load estimation, especially for high data rate users with high transmit power.

Moreover, the power based load estimation does not consider that DPCCH load will decrease when more date rate is granted, but assumes fixed DPCCH load during the load headroom to rate mapping. This leads to that data rate is under-granted and many iterations are typically required to get the desired data rate.

Hence, there exists a need for a method and a system that provides an improved determination of the uplink load.

SUMMARY

It is an object of the present invention to overcome or at least reduce some of the problems associated with existing methods and devices for determining the uplink load.

This object and others are obtained by the method and system as set out in the appended claims. Thus, determining or predicting the uplink load based on measurements, including CIR and adjustable parameters, where the parameters are adjusted based on measurements of received power, an improved determination of the uplink load can be obtained.

In accordance with one embodiment a method of load estimation in a cellular radio system is provided. The load estimation method comprises measuring the Carrier to Interference Ratio, CIR. In addition the load estimation is based on adjustable parameters, where the parameters are adjusted based on measurements of received uplink power from a User Equipment.

In accordance with one embodiment the load estimation is performed using at least two load parameters wherein one of the load parameters is fixed and adapted to adjust a second load parameter.

In accordance with one embodiment the load estimation is performed using a single adjustable load parameter.

In accordance with one embodiment the load estimation is performed independently of receiver type used in the radio base station.

In accordance with one embodiment the load estimation is performed iteratively.

The invention also extends to an estimator for performing load estimation in accordance with the above and to a radio base station comprising such a load estimator.

BRIEF DESCRIPTION OF THE DRAWINGS

The present invention will now be described in more detail by way of non-limiting examples and with reference to the accompanying drawings, in which.

DETAILED DESCRIPTION

Figure 1:
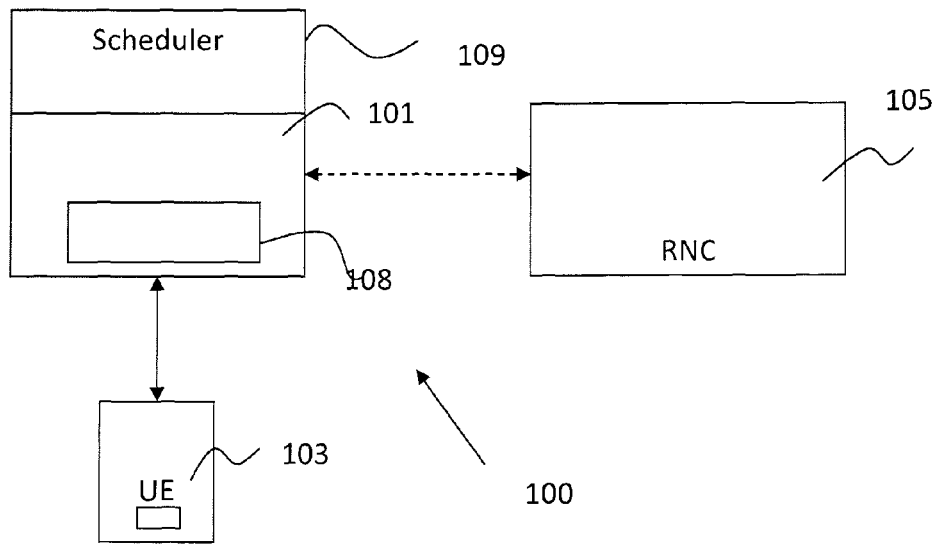
FIG. 1 is a view illustrating a cellular radio system.

In FIG. 1 a view of a cellular radio system 100 such as a WCDMA system is shown. The system comprises a number of radio base stations here denoted Node B 101. The NodeBs 101 can in turn be connected to a central node of the cellular radio system such as a Radio Network Controller (RNC). The base stations 101 are further connectable to User Equipments 103 of the radio system 100 over a radio interface, thereby providing access to the cellular radio system for a User Equipment located within an area covered by the cellular radio system.

The NodeB is provided with a scheduler 109 for scheduling transmissions from the UEs. In order to make efficient use of radio resources for the radio system, the scheduler 109 is adapted to take into account the uplink load when determining the maximum power offset (or equivalently, maximum date rate) a UE can use as described above. In order to determine the uplink load the NodeB is provided with a load estimator 108. The load estimator 108 can be configured in a number of different ways, some of which will be described below.

Figure 2:
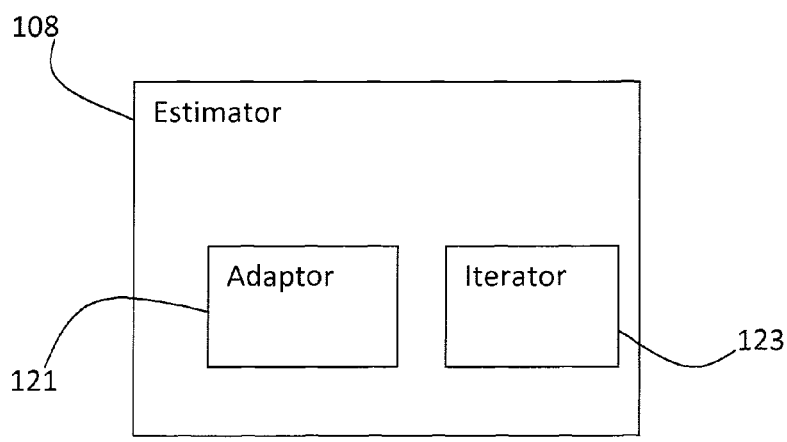
FIG. 2 is a view illustrating a load estimator.

In accordance with the present invention a CIR based load estimation is used while dynamically adapting the load parameter. In particular the load parameter is adapted independent of the receiver type. In FIG. 2 an exemplary load estimator 108 is shown in more detail. The exemplary load estimator 108 can comprise a load parameter adaptor 121. The load estimator 108 can also comprise an iterative load estimator 123 adapted to perform an iterative load estimation method. The iterative load estimator can for example be used for load headroom to rate mapping. Below some exemplary formulas that the load estimator 108 can be configured to implement are described in more detail.

General CIR Based Load Estimation

In principle any expression relates CIR to load can be used for load estimation regardless of the receiver types, as shown in formula (5):

$$\text{load}_{i\_est}^k = f(CIR_{1\_meas}^k, \text{pwroff}_{2\_est}^k, \ldots, \text{pwroff}_{i\_est}^k, \ldots, \text{pwroff}_{N\_est}^k, \text{loadpar}, \text{loadconst}_1, \ldots, \text{loadconst}_M) \quad (5)$$

The load constant(s) can be configured according to the receiver schemes and/or the average characteristics of the radio environment.

In accordance with one embodiment formula (2) is adapted to perform load estimation. In one exemplary embodiment one of the load parameters can be assumed fixed and adapt the other load parameter.

In another embodiment, formula (3) can be used where the single load parameter is adapted. It can be noted that with the CIR based load estimation, the estimated load is dependent on the power offset, or equivalently, the data rate. This implies that the CIR based load estimation can at least partly reflect the impact of data rate on load.

Load Parameter Adaptation

In one load parameter embodiment, the load parameter is adapted in a way independent of receiver types. One exemplary implementation is to use power based load estimation method to estimate the load that is already generated. For example by estimating $\text{load}_{i\_est}^k$ using formula (5), the load parameter can be calculated as:

$$\text{loadpar} = f^{-1}(CIR_{1\_meas}^k, \text{pwroff}_{2\_est}^k, \ldots, \text{pwroff}_{i\_est}^k, \ldots, \text{pwroff}_{N\_est}^k, \text{pwr}_{i\_meas}^k/\text{Itot}_{meas}, \text{loadconst}_1, \ldots, \text{loadconst}_M) \quad (6)$$

The power offset can be determined via E-TFC transmitted on E-DPCCH.

Another embodiment is illustrated by formula (7), where formula (2) is adopted for load estimation, loadpar$_1$ is assumed fixed and denoted as loadconst$_1$, and loadpar$_2$ is dynamically adapted. In this case the load parameter (loadpar$_2$) can be calculated as:

$$\text{loadpar}_2 = \frac{CIR_{1\_meas}^k \cdot \text{pwroff}_{i\_est}^k - \text{load}_{i\_est}^k \cdot \text{loadconst}_1}{\text{load}_{i\_est}^k \cdot CIR_{1\_meas}^k \cdot \left(1 + \sum_{i=2}^{N} \text{pwroff}_{i\_est}^k\right)}$$

$$= \frac{CIR_{1\_meas}^k \cdot \text{pwroff}_{i\_est}^k \cdot \text{Itot}_{meas} - \text{pwr}_{i\_meas}^k \cdot \text{loadconst}_1}{\text{pwr}_{i\_meas}^k \cdot CIR_{1\_meas}^k \cdot \left(1 + \sum_{i=2}^{N} \text{pwroff}_{i\_est}^k\right)} \quad (7)$$

In accordance with one embodiment filtering can be adopted for the load parameter adaptation. One example is shown as below:

$$\text{loadpar}_{new} = k \cdot \text{loadpar}_{new} + (1-k) \cdot \text{loadpar}_{old} \quad (8)$$

where k is the filtering parameter.

To estimate the load parameter(s), a Kalman filter, as described in T. Söderström, P. Stoica, "System Identification", Prentice Hall International, 1989 can be used. To further illustrate this equation (3) based load estimation is now used as an illustrative example. It is to be noted that the load parameter x is allowed to change with time, in response to a changing environment:

$$x(t+1) = x(t) + w(t) \quad (9)$$

Where w(t) constitutes process noise.

The power based load measurement is then equal to (3) with the addition of some measurement noise:

$$y(t) = x(t)CIR(t) + v(t) \quad (10)$$

where $$y(t) = \frac{\text{pwr}_{i\_meas}^k}{\text{Itot}_{meas}}$$

$$CIR(t) = CIR_{1\_meas}^k \text{pwroff}_{i\_est}^k$$

and v(t) constitutes measurement noise. Combining (9) and (10) a Kalman filter can be applied that balances the measurement inaccuracy with the rate of change in the load parameter x:

$$\hat{x}(t+1) = \hat{x}(t) + K(t)(y(t) - \hat{x}(t)CIR(t))$$

$$K(t) = \frac{P(t)CIR(t)}{CIR^2(t) + r_2}$$

$$P(t+1) = P(t) + R_1 - \frac{P^2(t)CIR^2(t)}{P^2(t)CIR^2(t) + r_2}$$

Where
$R_1 = E[w^2(t)]$
$r_2 = E[v^2(t)]$

The load parameter x can then in one exemplary embodiment be used in the load headroom-to-rate mapping described next.

Application to Load Headroom to Rate Mapping

Due to that the load parameters may change with data rate for some receivers (e.g. GRAKE), the load estimation algorithm needs to be performed iteratively when it is applied to load headroom to rate mapping. However, compared with power based load estimation less iterations are needed since the impact of data rate on load is, at least partly, considered in CIR based load estimation.

Figure 3:
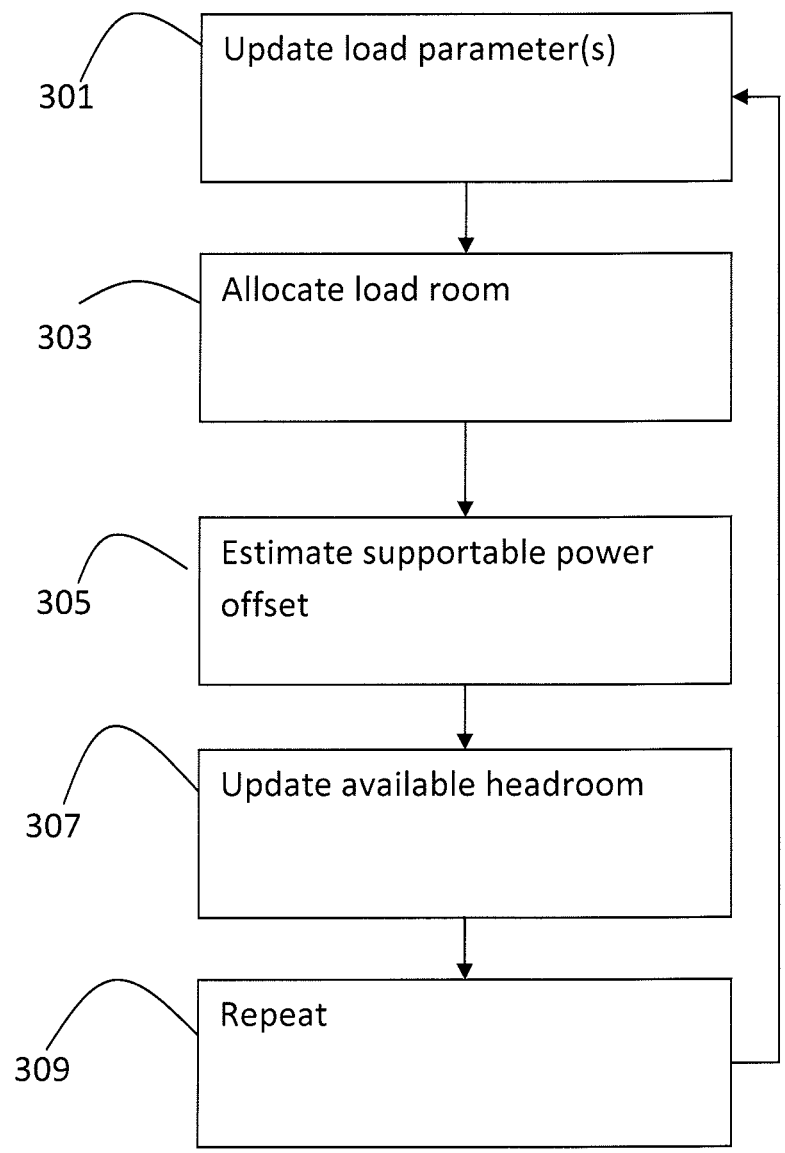
FIG. 3 is a flowchart illustrating steps performed when performing load estimation.

An exemplary procedure of load headroom to rate mapping with load estimation method is described below in conjunction with FIG. 3:

First, in a step 301, each user updates the load parameter(s) given the currently generated load (estimated with the power based load estimation), DPCCH CIR, power offset and possibly other parameters (load constant). Next, in a step 303, the available load room is allocated between users. The allocation depends on the scheduling strategy used.

Next, in a step 305, the maximum supportable power offset for a user given the available load room allocated for that user is estimated. In this procedure the CIR based load estimation is adapted with the updated load parameter. Next, in a step 307 the maximum load headroom available for the scheduler is updated. The steps are then repeated at the beginning of next scheduling interval in a step 309.

With dynamical adaptation of load parameter the load is more accurately estimated, which makes the resource utilization based scheduling schemes (e.g. resource fair scheduling) work more effectively.

The accuracy of load estimation and load headroom to rate mapping can be distinctly improved if the iteration is performed frequently enough, consequently brings evident performance gain. Even with large system delay better load estimation accuracy in average sense could still be achieved, which can be translated into some performance improvement, more or less.

Figure 4:
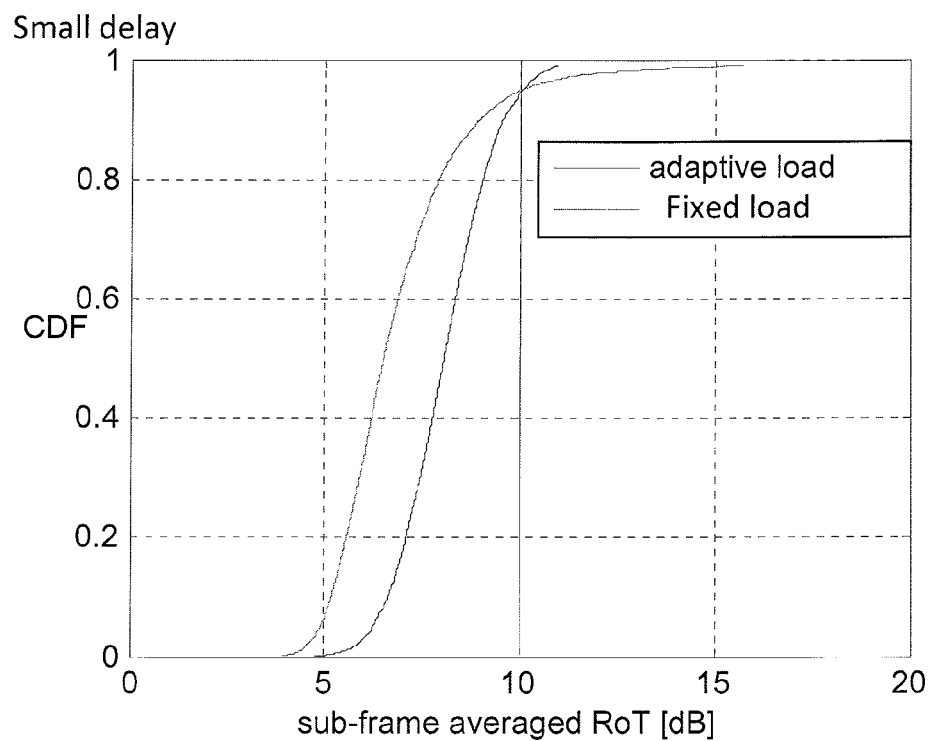
FIG. 4 is a view illustrating, the rise over thermal (RoT) and the uplink cell capacity with the fixed and the adaptive load parameters.
Figure 5:
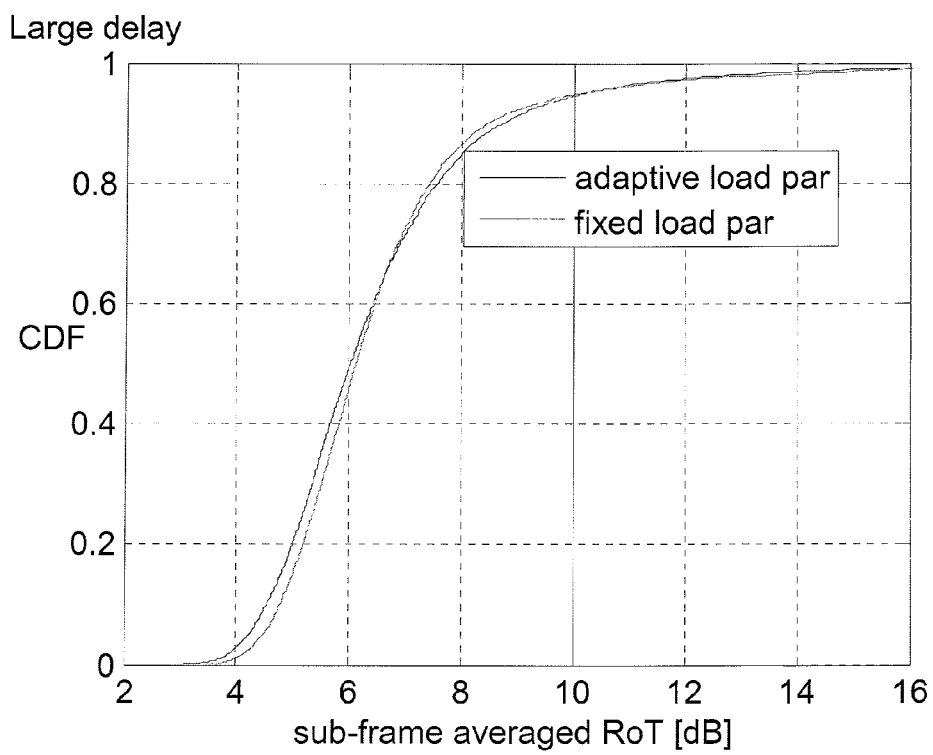
FIG. 5 is a view illustrating the oscillation in rise over thermal with adaptive load parameters.

In FIGS. 4 and 5, the rise over thermal (RoT) and the uplink cell capacity with the fixed and the adaptive load parameters is shown for small and large delays. The cell capacity is the maximum achievable cell throughput while the 95$^{th}$ percentile of the rise over thermal is below the target rise over thermal (10 dB).

In FIG. 4, FIG. 5 and Table 1, it can be clearly seen that by adopting adaptive load estimation, the oscillation in rise over thermal is substantially decreased (i.e. better uplink stability) and the uplink cell capacity is evidently improved with small system delays. Even with large system delays still some gain can be achieved in the uplink cell capacity although the gain is smaller compared with the case with small system delays.

TABLE 1

| [Mbps] | Uplink cell capacity, | |
| --- | --- | --- |
|  | Small delay | Large delay |
| Adaptive load par | 2.54 | 2.12 |
| Fixed load par | 2.12 | 2.01 |
| Capacity gain | 20% | 5.5% |

The dynamic adaptation of load parameter as described herein is independent of the receiver types used in the base station and provides good compatibility to new techniques. The use of dynamic adaption of the load parameter overcomes the shortage of pure power based load estimation. Also the method and device as described herein is less sensitive to system delays and less iterations are required to get the desired data rate. In addition implementation of resource utilization based scheduling is facilitated, since load is more accurately estimated. The method and device is also easy to implement.

The invention claimed is:

1. A method of load estimation in a cellular radio system where a number of User Equipment are connectable to a radio base station over an air interface, the method comprising:
measuring a Carrier to Interference Ratio (CIR);
adjusting one or more load parameters based on measurements of received uplink power from a User Equipment as a function of a power offset between a variable rate channel and a fixed rate channel utilized by the User Equipment; and
estimating an uplink load based on the measured CIR and the one or more adjusted load parameters.

2. The method of claim 1, wherein the adjusting comprises adjusting a second load parameter based on a first fixed load parameter.

3. The method of claim 1, wherein the one or more load parameters include a single adjustable load parameter.

4. The method of claim 1, wherein the estimating an uplink load is performed independently of a type of receiver used in the radio base station.

5. The method of claim 1, wherein the estimating an uplink load is performed iteratively.

6. The method of claim 5, wherein the estimating an uplink load is performed iteratively only when performing load headroom to rate mapping.

7. The method of claim 1, wherein the cellular radio system is a Wideband Code Division Multiple Access (W-CDMA) radio system.

8. The method of claim 1, wherein the one or more load parameters are adjusted also as a function of CIR, a total uplink interference, and one or more load constants.

9. A load estimator for determining uplink load in a cellular radio system in which a number of User Equipment are connectable to a radio base station over an air interface, the load estimator comprising:
an adaptor configured to adjust one or more load parameters based on measurements of received uplink power from a User Equipment as a function of a Dower offset between a variable rate channel and a fixed rate channel utilized by the User Equipment; and
an estimator circuit configured to:
measure a Carrier to Interference Ratio (CIR); and
estimate an uplink load based on the measured CIR and the one or more adjusted load parameters.

10. The load estimator of claim 9, wherein the load estimator is configured to adjust a second load parameter based on a first load parameter.

11. The load estimator of claim 9, wherein the estimator circuit is configured to estimate the uplink load using a single adjustable load parameter.

12. The load estimator of claim 9, wherein the estimator circuit is configured to estimate the uplink load independently of a type of receiver used in the radio base station.

13. The load estimator of claim 9, wherein the load estimator further comprises an iterator configured estimate the uplink load iteratively.

14. The load estimator of claim 13, wherein the iterator is configured to estimate the uplink load iteratively only when the load estimator is performing load headroom to rate mapping.

15. The load estimator of claim 9, wherein the adaptor is configured to adjust the one or more load parameters also as a function of CIR, a total uplink interference, and one or more load constants.

16. A radio base station operative to support communication with a number of User Equipment connectable to the radio base station over an air interface in a cellular radio system, the radio base station comprising:
an adaptor configured to adjust one or more load parameters based on measurements of received uplink power from a User Equipment as a function of a Dower offset between a variable rate channel and a fixed rate channel utilized by the User Equipment; and
an estimator circuit configured to:
measure a Carrier to Interference Ratio (CIR); and
estimate an uplink load based on the measured CIR and the one or more adjusted load parameters.

17. The radio base station of claim 16, wherein the radio base station is a Wideband Code Division Multiple Access (W-CDMA) radio base station.

18. The radio base station of claim 16, wherein the adaptor is configured to adjust the one or more load parameters also as a function of CIR, a total uplink interference, and one or more load constants.

* * * * *

UNITED STATES PATENT AND TRADEMARK OFFICE
CERTIFICATE OF CORRECTION

| | | |
|---|---|---|
| PATENT NO. | : 8,670,401 B2 | Page 1 of 1 |
| APPLICATION NO. | : 13/378105 | |
| DATED | : March 11, 2014 | |
| INVENTOR(S) | : Zhang et al. | |

It is certified that error appears in the above-identified patent and that said Letters Patent is hereby corrected as shown below:

In the Claims:

In Column 8, Line 16, in Claim 9, delete "Dower" and insert -- Power --, therefor.

In Column 8, Line 49, in Claim 16, delete "Dower" and insert -- Power --, therefor.

Signed and Sealed this
Ninth Day of September, 2014

Michelle K. Lee
*Deputy Director of the United States Patent and Trademark Office*